March 24, 1942. F. A. DOLL 2,277,309
SHUFFLE CONVEYER
Filed Oct. 12, 1939
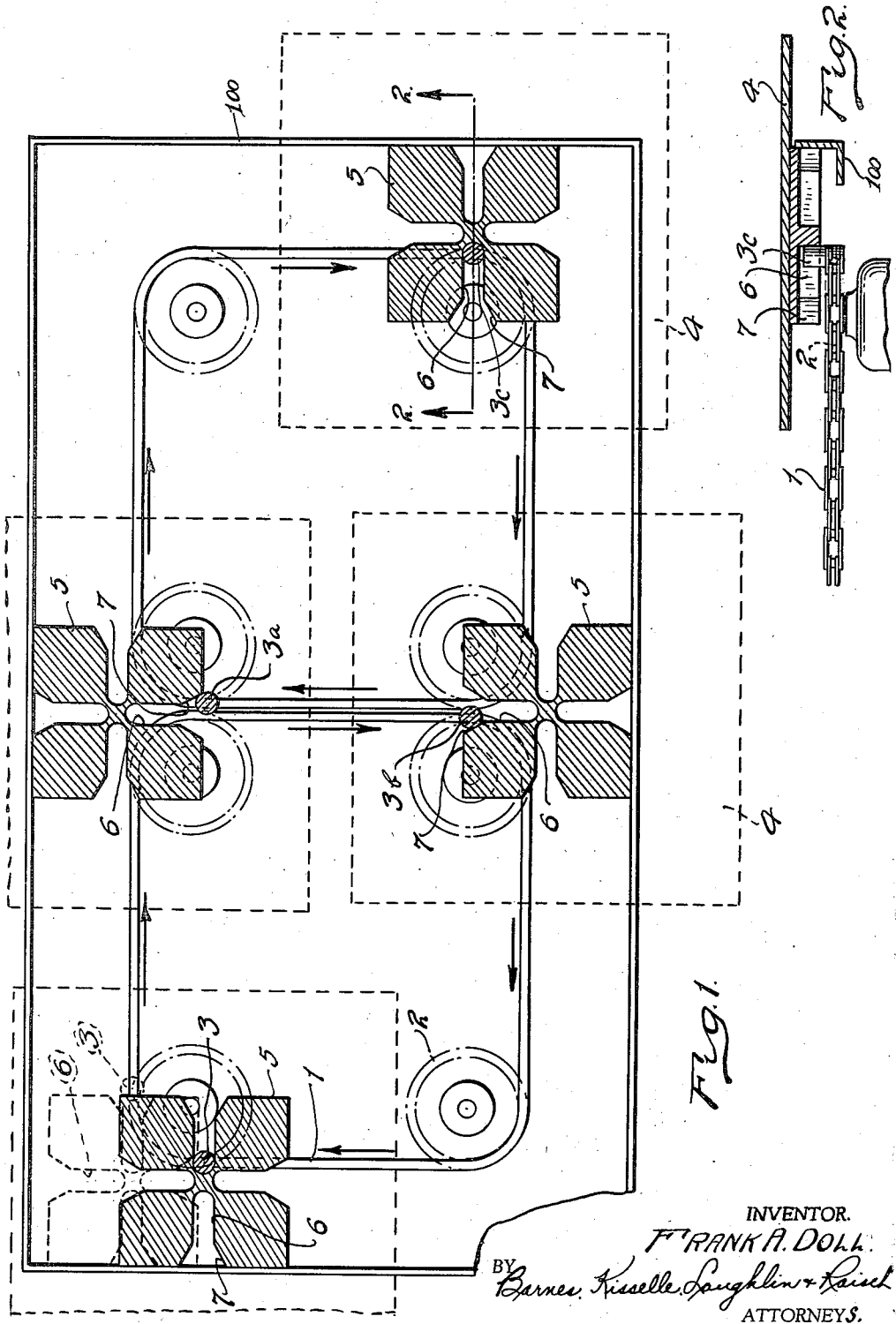
INVENTOR.
FRANK A. DOLL.
BY Barnes, Kisselle, Laughlin & Raisch
ATTORNEYS.

Patented Mar. 24, 1942

2,277,309

UNITED STATES PATENT OFFICE 2,277,309

SHUFFLE CONVEYER

Frank A. Doll, Detroit, Mich., assignor to General Motors Corporation, Detroit, Mich., a corporation of Delaware Application October 12, 1939, Serial No. 299,181

6 Claims. (Cl. 198—19)

This invention relates to conveyer systems. It is the object of the invention to provide a conveyer system in which the work carriage can be automatically left temporarily at each work station and then picked up to travel to the next work station. This is achieved by change in the direction of travel of the conveyer.

In the patent to Joseph R. Lex and Rudolph R. Heupel No. 2,227,145 issued December 31, 1940, a conveyer system of this type is shown in which the conveyer is arranged to turn four corners and handle three carriages. The arrangement shown in the Lex and Heupel application will work satisfactorily but it is only capable of handling three carriages.

The object of the present invention is to provide a system of juxtapositioned conveyer chains in combination with a specially adapted work carriage by which the carriage may be periodically engaged and left at the work stations and in which any number of conveyers may be positioned together to increase the number of positions where the work carriage can be caused to pause. For instance, with a single chain or cable unit, the conveyer is adapted to handle three carriages as described in the Lex and Heupel application. In the two cable units juxtapositioned, there are six work stations and the conveyers will handle four carriages. Each additional rectangular conveyer will afford two new stations and one additional carriage for the conveyer.

In the drawing:

Fig. 1 is a somewhat diagrammatical view of the apparatus taken on a horizontal sectional plane.

Fig. 2 is a section on the line 2—2 of Fig. 1.

Each conveyer unit comprises the chain or cable I and the sprockets or pulley wheels 2. Each chain or cable runs over four wheels defining roughly a rectangle. There are two units of the conveyer shown in Fig. 1 but any number may be used. For each additional chain or cable with the four sprockets or pulley wheels, two additional work stations may be added and one additional conveyer. But, the important cooperative feature of the apparatus is that the carriage shifts from one conveyer to the next as it passes along. Each cable or chain is provided with two driving pins 3. Each carriage 4 is provided with a fixture 5, each provided with four deep recesses 6 at the 90-degree points, each recess having a widely flaring mouth 7. The fixtures are guided by the rectangular track 100 which, as shown in Fig. 2, is of angle section.

The operation is as follows: The chains travel clockwise. Pin 3 is driving the fixture in the upper left hand corner of the drawing cross-wise on the conveyer to the position shown in dotted lines in this figure at which point the pin 3, in dotted lines, will be seen leaving the recess 6. But, just at the time it leaves the recess, the pin 3a on the second conveyer unit is engaging the other fixture on the top of the drawing and is about to shift it to the next conveyer unit. The same thing is happening to the other two fixtures as will be seen at the bottom of the drawing in Fig. 1. The right hand lower fixture is being driven cross-wise of the conveyer and the fixture in the mid-portion of the conveyer system is being engaged by the pin 3b on the left hand conveyer and shifted from the right hand conveyer unit to the left hand conveyer unit.

As stated above, with each rectangular conveyer that is added to the conveyer system, two new work stations are afforded and one new carriage may be added. It is, therefore, possible to provide any number of work stations that may be desired. In this arrangement, the carriage never in any way changes its position except to travel along, that is, the sides and ends of the carriage are always facing in the same direction.

Where the words "picks up" or "picked up" are used in the claims, this does not mean that there is any vertical component in this action.

I claim:

1. In a shuffle conveyer system, the combination of a plurality of juxtapositioned horizontal conveyers arranged to travel in angular endless paths, each comprising a flexible linear member, rotatable members over which the linear members pass and change their direction, each linear member having a plurality of driving members thereon, and carriages guided to travel in said angular paths and each provided with means adapted to receive a driving member as the driving member and linear member change their direction of travel and adapted to release the driving member when the driving member changes its direction of travel a second time, said carriage arranged to be then engaged by a driving member of the next adjoining conveyer as that driving member comes along and the linear member and the driving member change their direction of travel and to be released again when the last mentioned driving member and the linear member again change their direction of travel a second time, whereby a selectable number of work stations and carriages may be afforded by conveyers in juxtaposition.

2. The combination claimed in claim 1 in which the means on the carriage comprises a four sided plate with elongated recesses at 90-degree points in which the driving member enters an elongated recess and picks up the plate for movement when the driving member changes its direction of travel and in which the driving member leaves the plate at a station when it changes its direction of travel and pulls out of the recess.

3. The combination claimed in claim 1 in which the means on the carriages are substantially square fixtures with an elongated recess with a flared mouth in each side and in which each linear member carries two driving pins.

4. A shuffle conveyer having a flexible endless linear driving member arranged to travel in a substantially rectangular path and provided with a plurality of pins, a carriage arranged to be picked up at a station and left at the next station by said pins, the carriage having a fixture guided to travel in a determined path and comprising a four sided member with deep recesses at the 90-degree points and said recesses completely separated one from another, a pin picking up a fixture when the linear member changes its direction of travel and leaving a fixture when the linear member changes its direction of travel a second time, said pin operating by simply entering the recess from one direction and then when the travel of the pin changes pushing on the fixture by engaging the side wall of the recess and then leaving the fixture by passing out of the recess as the direction of travel of the pin changes again.

5. In a shuffle conveyer, the combination of a conveyer chain arranged to travel in a substantially rectangular path and provided with a pair of pins, and a carriage fixture guided to travel in a determined course and arranged to be picked up by the pins and comprising a substantially square plate having a deep recess on each side into which a pin can enter as the chain and pin change their direction of travel and from which the pin may retreat in the way the pin came into the recess as the pin and chain change their direction of travel a second time, the said recesses being entirely separate one from another.

6. In a shuffle conveyer, the combination of a conveyer chain arranged to travel in a substantially rectangular path and provided with a pair of pins, and a carriage fixture guided to travel in a determined course and arranged to be picked up by the pins and comprising a substantially rectangular plate having a deep recess on each side into which a pin can enter as the chain and pin change their direction of travel and from which the pin may retreat in the way the pin came into the recess as the pin and chain again change their direction of travel, the said recesses having flared mouths and being entirely separate one from another.

FRANK A. DOLL.